United States Patent [19]

Perry, Jr. et al.

[11] Patent Number: 5,047,298
[45] Date of Patent: Sep. 10, 1991

[54] CLOSED LOOP REACTANT/PRODUCT MANAGEMENT SYSTEM FOR ELECTROCHEMICAL GALVANIC ENERGY DEVICES

[75] Inventors: John H. Perry, Jr., Riviera Beach; Abraham Person, Palm Beach Shores; Steven M. Misiaszek, Tequesta; Donald P. Alessi, Jr., Lake Park, all of Fla.

[73] Assignee: Perry Oceanographics, Inc., Riviera Beach, Fla.

[21] Appl. No.: 612,350

[22] Filed: Nov. 13, 1990

[51] Int. Cl.$^5$ .............................................. H01M 8/04
[52] U.S. Cl. ........................................ 429/17; 429/19; 429/26; 429/34
[58] Field of Search ....................... 429/19, 17, 20, 26, 429/34, 25, 14, 24, 38, 39, 13

[56] References Cited

U.S. PATENT DOCUMENTS

| | | | |
|---|---|---|---|
| 4,365,007 | 12/1982 | Maru et al. | 429/19 |
| 4,582,765 | 4/1986 | Kothmann | 429/13 |
| 4,759,997 | 7/1988 | Ohyauchi et al. | 429/19 |
| 4,886,157 | 8/1987 | Miyake et al. | 429/19 |

Primary Examiner—Anthony Skapars
Attorney, Agent, or Firm—Paul J. Sutton; Barry G. Magidoff; Anthony Amaral, Jr.

[57] ABSTRACT

The present invention teaches a closed loop energy system including means capable of managing both the cooling cycle and the fuel/oxidant gas flow in conjunction with a fuel cell. The system includes a plurality of galvanic cells, gas flow conduit means, internal fluid flow conduit means, heat exchanger means, liquid-gas separator means, and gas repressurization means.

9 Claims, 4 Drawing Sheets

CLOSED LOOP REACTANT/PRODUCT MANAGEMENT SYSTEM FOR ELECTROCHEMICAL GALVANIC ENERGY DEVICES

This invention is directed generally to a closed loop system for the management of hydrogen-oxygen fuel cells. More specfically, this invention is directed to a low temperature hydrogen-oxygen fuel cell requiring cooling water and gas flow management.

BACKGROUND OF THE INVENTION

Fuel cells are galvanic systems which operate following similar electro-chemical principles as in conventional storage batteries. There is a positive and negative electrode separated by an ion-conducting electrolyte adapted to carry current generated by a catalyzed chemical reaction. The fuel cell, however, has a theoretically infinite power output capability, as long as fuel and oxidant are continuously fed to the system for reaction. For example, the current flow in the traditional hydrogen-oxygen fuel cell is generally provided by the flow of electrons associated with the passage of an ion through an intervening electrolyte medium.

There are generally three distinct types of low temperature hydrogen-oxygen fuel cells: the solid polymer proton exchange membrane fuel cell, the alkaline fuel cell, and the phosphoric acid fuel cell. All of these types generally operate at below about 250° C., in aqueous systems. Electrical energy is produced by the catalyzed reaction between hydrogen and an oxidizing gas, usually pure oxygen, with the movement of an ion, i.e., a proton or hydroxyl ion ($OH^-$), through an electrolyte connecting the positive to the negative electrode. In the alkaline fuel cell, the electrolyte is highly concentrated (at least about 30 wt. %) aqueous potassium hydroxide solution, the concentration determining the maximum operating temperature. This hydroxide electrolyte is generally maintained within a solid matrix, including, for example, asbestos, together with a catalyst. The catalyst can be, in addition to the noble metals, nickel, silver, certain metal oxides and spinels.

The second type of low temperature fuel cell is the phosphoric acid fuel cell, which utilizes concentrated phosphoric acid as the electrolyte. This fuel cell operates at temperatures in the range of between 150° C. and just over 220° C. The concentrated acid electrolyte is preferably at approximately 100% concentration, and is retained in a solid matrix, such as silicon carbide(SiC). The electro-catalyst, which impregnates both the anode and the cathode, can be platinum or other such noble metals.

An efficient low temperature system, which also operates at temperatures below the boiling point of water, includes a solid polymeric proton exchange membrane between the fuel cell electrodes. The membrane is formed from, for example, perfluorocarbon materials sold, for example, under the trademark "NAFION" ® by E. I. DuPont De Nemours. A noble metal catalyst is also required for most polymeric membrane type of fuel cells.

Commonly available solid polymer electrolyte fuel cells require input of reactant gases, usually a hydrogen fuel and an oxidant, generally oxygen or air, and of water, for cooling and for maintaining the electrolyte membrane.

The cooling systems for the solid polymer electrolyte fuel cells are of two types: the water flow, or pass-through, type, where cooling water from outside the cell is provided for indirect heat exchange from impervious conduits within the cell; and the passive, or wicking, type of cell, by evaporative cooling, wherein water is caused to evaporate from the anode support plates, which are formed to have a large surface area.

For both types of cooling systems, the solid polymer electrolyte membrane must be kept moistened with water; otherwise the membrane will dry out, and become inefficient in operation as well as structurally weakened. Water is generally carried from the fuel, or hydrogen, side of the membrane, together with the proton, through the membrane, thereby tending to dry the anode side of the membrane, and causing cracking of the membrane. In operation, additional water must thus be supplied with the hydrogen, to compensate for the water removed.

One system to improve cooling of the fuel cell, while at the same time maintaining humidification of the fuel side of the membrane, is shown, for example, in U.S. Pat. No. 4,649,091.

As commercially available, the so-called "fuel cell" is actually a stacked configuration of a plurality of cells each having an anode and a cathode, with a solid electrolyte membrane between them, and passages for fuel and oxidant gas. To maintain a continuing operation of such a stack of cells requires a system that provides sufficient cooling to prevent overheating of the system and means to provide the fuel and the oxidant, in a managed system to maintain a sufficiently long operating time between shutdowns.

In some conventional fuel cell stacks, the hydrogen and oxygen gases are delivered to the stack in excess of that needed to support the electro-chemical reaction. There is thus a continuous flow through the stack, and an exhaust from the stack by which product water is removed and any inert gases are vented together with the excess hydrogen and oxygen. Generally, the great majority of the product water is removed with the oxygen purge, whereas only a relatively small amount of condensation is removed along with the hydrogen purge. Generally, the fuel and oxidant gases first pass through humidification cells within the cell stack. The gases are there saturated with pure water vapor in order to prevent dehydration of the ion-conducting membrane. The humidified gases are then passed through the anode and cathode chambers, respectively, of the cells within the stack, the cells being fed in parallel; and the excess gases are then vented from the final cell. Although the gas and liquid flow through the stack system is in parallel, i.e., through the individual cells, the electrical connection between the individual cells is conventionally in series.

The cooling water within the stack must be extremely pure, e.g., deionized water having a high resistivity. The cooling water passes through an external indirect heat exchanger where the heat is transferred to, for example, a parallel or countercurrently flowing stream of raw water. This same internal cell cooling water has been conventionally used to humidify the gas streams within the humidification stage of the cell stack.

SUMMARY OF THE PRESENT INVENTION

The present invention provides a means to manage both the cooling cycle and the fuel and oxidant gas flow of a fuel cell stack, in a simple and self-adjusting manner. The result of this careful management of such a system is to provide a greater campaign duration for the operation of the fuel cell before shutdown is required, and simultaneously to conserve fuel and oxygen supply for a system of limited fuel capacity, such as on board a submarine. By maintaining all of the products within a closed system, the present invention also precludes the need for additional ballast control, e.g., for a submarine or aircraft. Finally, the management system further preferably provides for external humidification of the system without risking contamination of the fuel and oxygen gases, using pure product liquid.

It is therefore an object of the present invention to provide an improved water management system for a low temperature fuel cell stack.

It is the further object of this invention to provide an improved gas flow management system in combination with a water flow management system to provide necessary humidification of the fuel cell electrolyte and while maintaining a sufficiently low concentration of inert diluent within the fuel cell system to maintain a long operating period between shut-downs.

It is yet a further object of this invention to provide a closed system for a fuel cell wherein all reactants and products are maintained within the system without loss.

DETAILED DESCRIPTION OF THE INVENTION

The present invention, generally, and the systems shown in the figures of the drawings herewith, are intended to provide a reliable and efficient air-independent power system for such enclosed uses as submersible vehicles, submerged underwater installations, or space vehicles, using hydrogen and oxygen as the fuel and oxidant for a fuel cell power source. Most preferably, the present closed loop management system is most effectively used within an enclosed package requiring only hydrogen and oxygen makeup gas input, external indirect heat exchange, electric power output, and electronic inputs and outputs.

Figure 1:
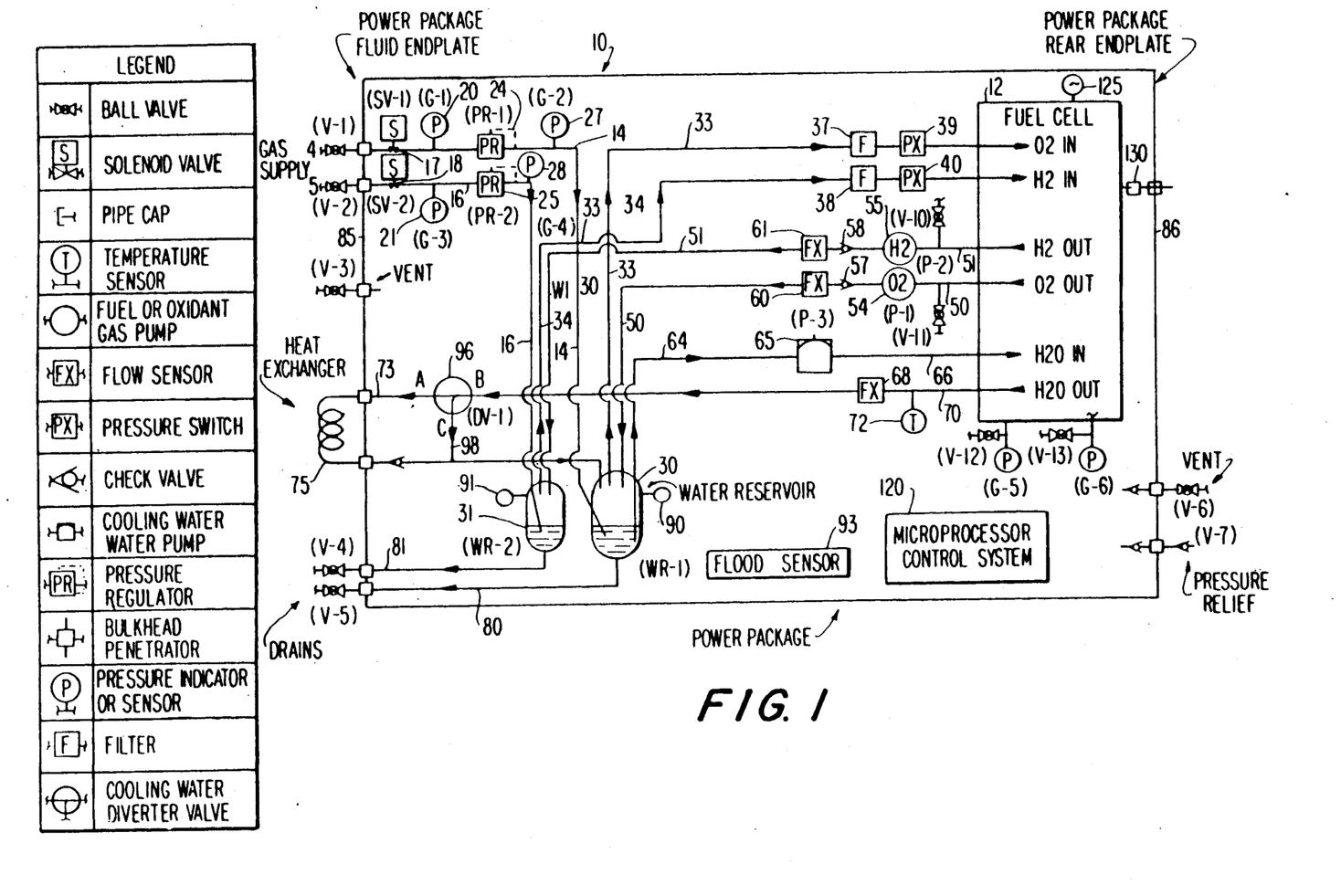
FIG. 1 is an overall schematic diagram of a preferred system in accordance with the present invention.

Referring to the system design shown schematically in FIG. 1, a fluid and pressure-tight chamber, the walls of which are indicated by the numeral 10, contains a fuel cell power source, generally indicated by the numeral 12, of a relatively low operating temperature type. Most preferably the proton exchange membrane type fuel cell is utilized, which operates below the boiling point of water, generally not above 70° to 75° C. There is no requirement to maintain a liquid electrolyte between the anode and cathode of each cell.

As most generally now configured, the fuel cell power sources are provided in the form of stacks of fuel cells, literally stacked one next to the other and having anodes and cathodes arranged in electrical series. The flow of reactants, i.e., hydrogen and oxygen, to the individual fuel cells is generally arranged in parallel. As will be discussed below, it is most effective to utilize a plurality of separate stacks which can continue to operate jointly, albeit at a lower power level, even if a cell in one or more of the individual stacks is incapacitated. By virtue of the configuration of the stacks, the obstruction or inactivity of any individual cell will inactivate the entire stack within which such cell is located.

The power source container 10 is a compact modular assembly which can be inserted, as a unit, into a system requiring a power source, either as the primary source or as a back-up source of power.

The closed loop management system of the present invention is discussed below in terms of a solid polymer membrane electrolyte system which requires both cooling and humidification water. In this system, the supply tanks for the hydrogen reactant and the oxidizing gas, e.g., oxygen, are located externally of the module container. These fuel and oxidizer tanks can be of standard, or conventional, design such as so-called "gas bottles", containing the gases at pressures of up to about 2200 to 2500 psig. These bottles are generally equipped with manual valves and can be connected by known means through the power module end plate into the module.

Each of the oxygen and hydrogen gas make-up supply lines 14, 16, respectively, include a solenoid operated valve 17, 18 and a gas pressure sensor (or indicating gauge) 20,21 measuring the gas pressure in each line. Each line further comprises a remotely resettable pressure regulator 24,25, followed downstream by a further gas pressure sensor 27,28. The incoming make-up gas lines 14,16 pass into water reservoirs 30,31; the gas enters the reservoirs at a lower level, below the water level, so as to bubble through any liquid therewithin for humidification of the gas. The water reservoirs 30,31 are both pressure-tight so as to maintain the gas line pressures.

The gas feed lines 33,34 between the reservoirs 30,31 and the fuel cell stack 12, include each a filter 37,38, to remove any solid particles, before passing through a pressure sensor 39,40, respectively, before entering the fuel cell stack 12. The design of the flow passages within the fuel cell stack is determined by the particular manufacturer of the fuel cells and is not an element of this invention.

Useful such fuel cell stacks include the Ballard Fuel Cell Stack, having an overall volume of approximately 1.5 cubic feet and weighing about 100 pounds. Such a fuel cell stack is stated by the manufacturer to contain 42 cells and is capable of generating 5 kilowatts utilizing hydrogen and oxygen. The fuel cell membrane electrolyte can be a sulfonated fluorocarbon, such as NAFION, manufactured by DuPont.

Such a fuel cell can operate continuously at an internal temperature of about 70° C., with respect to the cooling water, but can start-up at room temperature, producing about 85% of rated power at that temperature at full constant voltage. The stack can warm up within a few minutes from the heat generated by the fuel cell. Accordingly, the cooling water is not required to be directed to the heat exchanger, until the desired operating temperature is reached. The fuel cell can be operated continuously or intermittently at the full range of power from 0% to 100%.

By replacing NAFION with a new sulfonated fluorocarbon membrane made by Dow Chemical, current densities have been increased to 4000 amps per sq. ft. at cell voltages in excess of 0.5 volts per cell, thus giving power density in excess of 2 kilowatts per sq. ft.

Other useful fuel cells of the solid membrane electrolyte type are shown, for example, in U.S. Pat. Nos. 4,175,165; 4,795,536; 4,678,724; and 4,826,741. Although the latter patent obtains hydrogen from a metal hydride source, the fuel cell operating on the generated hydrogen gas would be effective in the present system.

After flowing through the fuel cell stack, the excess remaining hydrogen and oxygen gases exit the stack through outlet piping 50,51, respectively. The pressure of these excess gases must be increased before the gas can be recycled. In this embodiment, the gases are each repressurized by the gas recycle pressure pumps 54,55.

These recycle pressure pumps 54,55 can be powered by the electrical output from the fuel cell, as part of the "hotel load" on the fuel cell. As an alternative to such an electrically powered recycle pump, an eductor type system can be employed, utilizing the gas flow from the gas supply bottles. This reduces the usage of electricity without in any way diluting or contaminating, or otherwise interfering with the reactant gas flow.

A check valve 57,58 is provided in each return gas line 50,51, respectively, to prevent any backflow; and a gas flow sensor 60,61 is provided in each line 50,51 to measure the recycle gas flow in each line. The recycle gas lines 50,51 then connect to the upper portion of the water reservoirs 30,31, where the recycle gases are mixed with the make-up gases from lines 14 and 16.

In this embodiment, the upper portion of each of the water reservoirs 30,31 comprises the free space above the water level in the reservoir, and each such free space acts as a liquid-gas separator, any liquid water drops out while the gas is resident in the free space, separating from the gas streams, and falling into the lower reservoir section of the vessel. There is free gas space above the liquid level, from which the now liquid-free, but humidified, gas enters the inlet lines 33,34 to the fuel cell stack 12. It is understood that other designs, including separate liquid-gas separators, e.g., centrifugal separators, can be used, in vessels separate from the reservoirs.

Cooling water must be pure deionized water. Only a relatively small quantity of water is required at start-up in the water reservoirs 30,31.

The cooling water is pumped from the oxygen water reservoir 30, by a water pump 65, and through lines 64 and 66 into the cooling system within the fuel cell stack 12. The flow of cooling water is measured, preferably at the exit from the fuel stack, by an in-line flow sensor 68. Water exits from the cooling system of the fuel cell stack through a water recycle line 70, at which exit point the water temperature is measured by temperature sensor 72. The water flows through line 70 to a location outside of the power package envelope 10, passing through an indirect heat exchange coil 75, which is in contact with any suitable source of cooling medium, before being returned to the oxygen-side water reservoir 30. For example, on a submersible or other seagoing vessel, the heat exchanger would be in contact with raw seawater. In other situations, cooling gases or other liquids, passing through (or over) a suitable heat exchange surface, can be utilized. The design of the indirect heat exchanger 75 is not a part of this invention, and any suitable design capable of cooling the recycling cooling water to below about 40° C. can be used.

The water added to the hydrogen reservoir 31 during operation is a result of condensation from the recycled hydrogen gas. If desired, additional water can be provided through initial feed/drain line 81, or excess water can be drained, especially from the oxygen reservoir 30, in the event a lengthy operating campaign causes the product water level in that reservoir 30 to increase so that there is inadequate free space below the gas lines 50,33.

Figure 2:
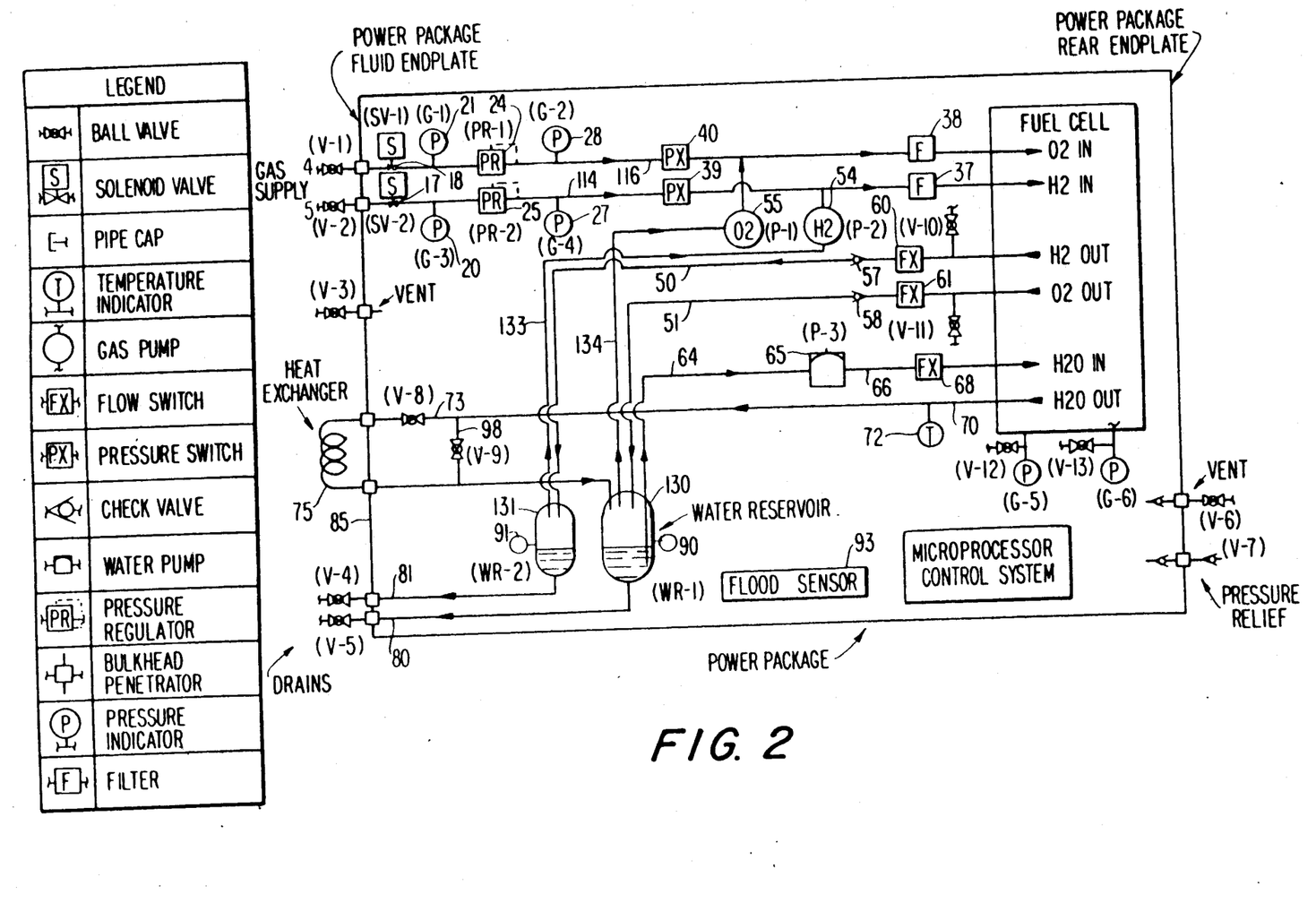
FIG. 2 is a schematic diagram of an alternative system which does not provide external humidification for the cell gases.

Referring now to FIG. 2, a substantially similar system is disclosed, except that the makeup hydrogen and oxygen gases are fed directly from the gas supply 4,5 into the stack, without being humidified in the water reservoirs 130,131. This alternative system requires a humidification section in each fuel cell stack to insure against drying out the membrane electrolyte. This is especially onerous in those situations where separate fuel cell stacks are operated within the module package; a separate humidification section would be required for each of the separate stacks in the embodiment of FIG. 2. By utilizing the system of FIG. 1, wherein all makeup gases are prehumidified, each of the stacks can be further reduced in size and weight by omitting the humidification section. As the water reservoir 130 remains a feature of this system with or without the prehumidification effect, the reduction in weight and volume of the fuel cell stack and the overall power package is clear.

By eliminating the internal humidification sections within each cell, for example, in a system utilizing three separate fuel stacks, approximatley 20% additional power cells can be obtained within the same volume and weight.

In addition to improving the efficient use of a fuel cell stack power source, the closed loop system of the present invention permits a closer management of each of cooling water, product storage and gas flow through the fuel cell stack. A preferred aspect of any such system is the use of a system-wide sensing network, having a central logic control module for reading and reacting to data remotely provided by individual sensory elements located throughout the system. As is shown by the monitoring and control system block diagram of FIG. 3, data collected by the sensing units located within the closed loop system are fed to a central programmable controller, which provides output data to the onstream operator as well as providing diagnostic information during and after operation of the power pack. In addition, the programmable controller provides a fail/safe response to the data, individually or combined, received from the various sensing elements, in the event the data are outside of the prescribed range of values.

Figure 3:
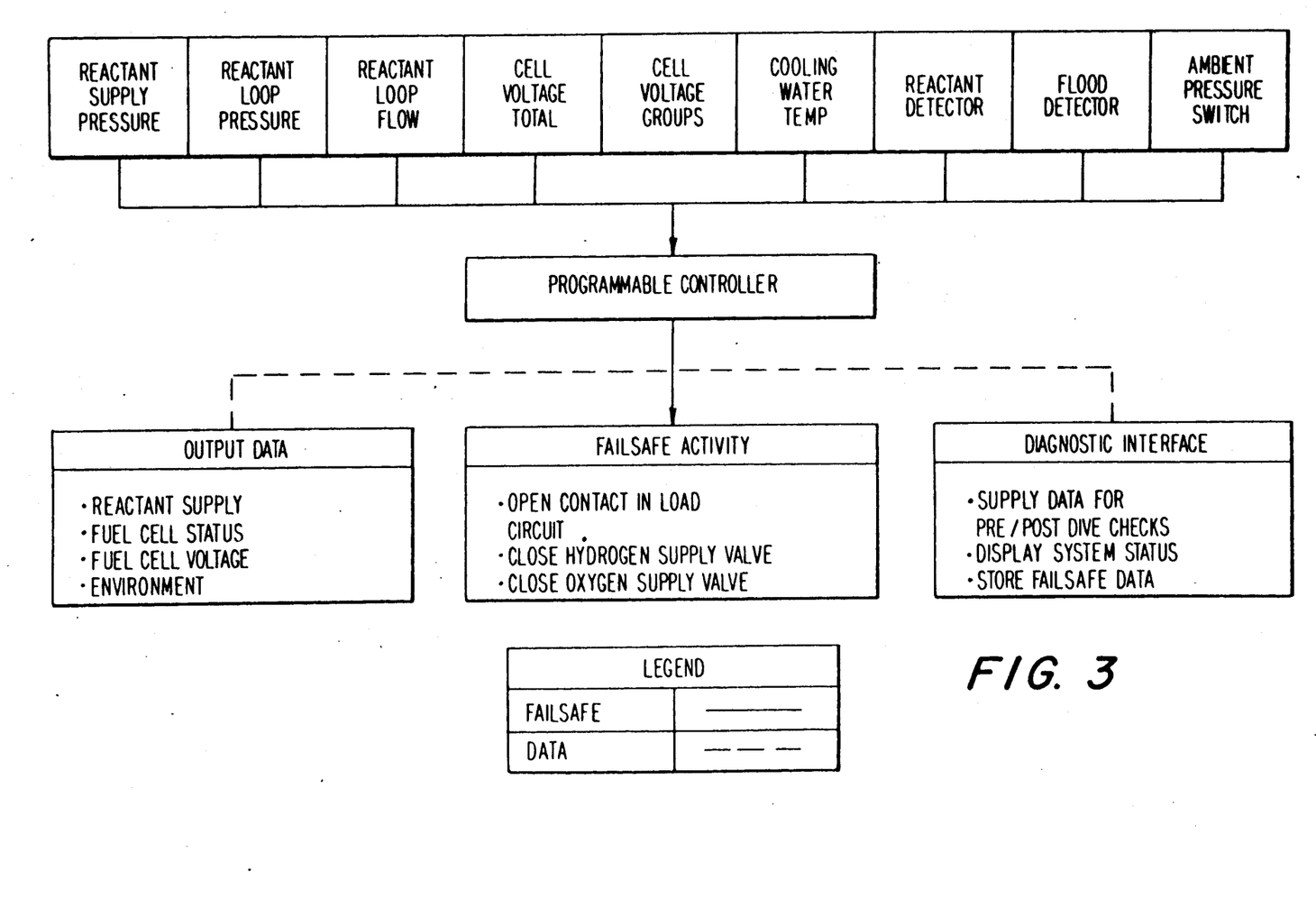
FIG. 3 is a block diagram of the programmable control system for the closed loop fuel cell stack of the present invention.

Specifically, the preferred logic control system receives sensory data input from the input pressure sensors 20,21 for the oxygen/hydrogen makeup supply gases, respectively, from upstream of the initial pressure regulators 24,25, as well as from downstream of the pressure regulators, by sensors 27,28. It has been found, however, that these sensory locations are not among those required to optimize the system.

Those critical sensory locations for providing data to the microprocessor system, which are the minimum necessary to achieve automatic microprocessor control of the closed loop fuel cell power package of this invention, include pressure sensor 39,40 in the hydrogen and oxygen fuel cell inlet lines, respectively, immediately upstream of the inlet to the fuel cell stack. The other necessary sensing locations for providing input data to the central cotnroller include the following: the gas flow sensors 60,61 (volumetric measurement at STP) in the recycle oxygen and hydrogen exit lines 50,51, respectively, from the stack 12, immediately downstream of the repressurization pumps 54,55; the temperature sensor 72 and water flow sensor 68 measuring the cooling water outlet temperature and volumetric flow rate in the water exit line 70 from the fuel cell stack internal cooling system; and the water level within the water knockout reservoirs 30,31 as measured by the water level indicators 90,91, respectively. These data signals are sent to the central logic control system.

Although the primary concern with respect to the water level in the reservoirs 30,31 is flooding, of the water reservoirs 30,31, and thus blocking of the gas flows in and out of the fuel cell through the oxygen and hydrogen gas lines 33,50,34,51, it is also important to maintain a minimum water level in order to insure there is adequate cooling and humidification, or water saturation, of the gases flowing into the fuel cell stack. As previously explained, humidification is necessary in order to maintain the integrity of the membrane electrolyte.

For security reasons, a flood sensor 93 is preferably provided to indicate if there is any liquid flooding into the powe package container 10 and hydrogen gas detectors to note the presence of explosive hydrogen gas within the package container 10, outside of the fuel cell stack closed gas loop. Finally, the control system must have input from the sensor elements 125 measuring total fuel cell stack voltage output as well as voltage output measurements for selected individual groups of cells within the stack; the selection of the groups of cells to be combined to check voltage output is determined by each individual manufacturer, who provide voltage taps on the exterior of the fuel cell stack shell 12, for such data sensing. Generally, a single, multi-pin electrical outlet is provided for the output tap for the various voltage measurements.

The control system further provides for automatic operation of the system so as to shut down the system in the event sensory data indicates potentially dangerous conditions. The data are recorded and compared with standard values, programmed into the programmable logic controller 120, as parameters for the evaluation of the system. Thus, if certain programmable values are not met by the received data, the programmable controller is set to deactivate this system by activating the following functions: disconnecting the electrical load from the fuel cell; closing the solenoid inlet gas valves 17,18, thus shutting off makeup oxygen and hydrogen gases, respectively, from entering into the system; while continuing to leave open the gas recirculation lines 50,51, and 35,34, including operation of the recycle pumps 54,55, for a sufficient time to permit the removal of condensate from the fuel cell stack, and to lower the fuel cell stack temperature by continuing the operation of the cooling water flow by maintaining the water pump 65.

In addition, the controller system is able, by programmable feedback operations, to increase makeup gas flow by controlling the pressure regulator valves 24,25, and can control the temperature within the fuel cell by activating the bypass valve 96 in the cooling water line to pass the water flow through the external heat exchanger 75, or through the shunt line 98 for recycling directly back to the water reservoir 30.

The closed loop system herein described is selfregulating over a major portion of its operating range. The inlet pressure regulators 24,25 respond to demand from the fuel cell to provide sufficient flow to maintain the desired pressure drop within the system, between the inlets 39,40 and the fuel cell outlets 50,51, as the gases are converted to water. The recycle flow rate is thus determined solely by the action of the repressurization pumps 54,55, or other means.

The repressurization recycle flow pumps 54,55 are generally maintained for constant recycle flow during the operation of the fuel cell. Generally the recycle is varied only downwardly if the cell is to be operated at idle, i.e., at extremely low power outputs, to minimize hotel power requirements.

The container 10, packaging the fuel cell stack and the closed loop system is fluid and pressure-tight so as to substantially exclude from within the container any pressure changes in the surrounding ambient conditions. All piping penetrating the container shell 10 generally pass through the end bulkheads 85,86, for providing the necessary inputs and outputs of data, control signals, reactants, water and electrical power.

Suitable microprocessor control systems are conventionally and commercially available; such systems are preferably programmable by any of the available binary logic programming or operating systems. The central processing unit of the controller system must have sufficient memory and operating capacity so as to register and record reactant supply pressures, total cell voltage output, the voltage output from groups of cells and the cooling wate temperature and flow. One such useful system is manufactured by Gould Electronics and designated PC-0085. The present system, as depicted in the accompanying drawings, requires the ability to register, record and react to at least 12 data input sources and must be capable of acting upon at least 6 operating devices.

Other suitable programmable controllers include the TSX17 manufactured by Telemecanique; the Omran C-20K programmable controller by Allen-Bradley, a division of Rockwell International; the General Electric Company's Series 90-30 programmable controllers are also usable in the present system.

The materials of construction for the various plumbing and mechanical components useful in the closed loop management system of the present invention must be of sufficient structural strength to support and uphold the integrity of this system, and must be chemically noninterfering with the system. Generally, this requires that none of those materials of construction which are in any way exposed to the reactant gases or to the cooling water within the system, release free ions into solution or otherwise react with hydrogen or oxygen under the operating conditions. Useful such materials which are thus inert to the working fluids of hydrogen/oxygen and deionized water include the following: 316 passivated stainless steel, fluorochlorohydrocarbons, such as Teflon, Viton polymers, polycarbonates, and silicon glass. Buna-N polymers and natural rubber, as well as all copper-containing metal alloys are expressly excluded. The piping connections should be welded and closed with O-ring face seals.

The reactant gases, preferably at least 99.9% pure hydrogen and medical grade oxygen, should be maintained at a pressure of not less than about 100 psig. Pressurized "bottles", which are commercially available, generally are rated at pressures of from about 2000 to 2500 psig. Each of these bottles should be provided with manual shutoff valves. In addition to such bottles of highly pressurized gases, other means of storing hydrogen include, for example, materials which are chemically reactive to form hydrogen, such as metal hydrides or methanol, or cryogenic storage devices; these are known and do not constitute a part of this invention.

The solenoid shutoff valves 17,18 are designed to be fail closed, i.e., they shut off flow when a power interruption occurs or power is intentionally removed. Generally, pressure regulator valves should be suitable for use across the full range of pressures of the storage devices and the minimum pressure required for fuel cell power production. The pressure and flow sensors can either be of the minimum or maximum signalling type, or can provide quantitative values on a continuing basis.

The water reservoirs 30,31 must be capable of withstanding a pressure of not less than 150% of the maximum fuel cell pressure. The height-to-width ratio of the reservoirs is preferably not less than 1.5, in order to provide for the desired free space above the top water level. The oxygen reservoir, in which is collected the product water from the fuel cell and which holds the deionized cooling water, should have a total volume of at least about 0.5 liters of deionized water pe kW-hour output rating for the fuel cell stack or stacks, with a free space below the gas lines 34,51 of at least about 4 ins. The hydrogen reservoir should hold at least about 50 mls of water per kW-hour maximum output power rating. Initially, at startup, there need be provided in the reservoirs 30,31 only sufficient water to provide the required humidification of the reactant gases and cooling of the stack.

The recirculating gas pumps 54,55 in the hydrogen and oxygen recycle lines, respectively, must provide a discharge pressure at least sufficient to start against the maximum fuel cell rated pressure. The pumps can be any of the centrifugal, diaphragm or positive displacement type pumps, formed of suitable materials of construction.

The water recirculation pump similarly can be of any commercially available type, again formed from suitable materials of construction to avoid any transfer of ions into solution in the flowing cooling water.

The recirculation pumps 54,55 for the reactant gases, as explained above, can be substituted with an eductor-type system utilizng the pressure drops and flow between the, e.g., gas supply bottles, and the fuel cell inlets. By this means, additional power savings are obtained; generally the flow of gases to the fuel cell is more than adequate to provide the needed energy for the recirculation pressurization.

The electrical connections between the various sensory and operational locations within the power package container 10 and the microprocessor control system 120 are in accordance with conventional standards for explosion proof systems. The only requirement, except for suitable conductivity, revolves about the safety requirement when dealing with hydrogen gas. Generally, commonly available such control systems are adequately insulated and of sufficiently low power that there should be no danger of explosion, even if hydrogen gas is released into the environment.

Figure 4:
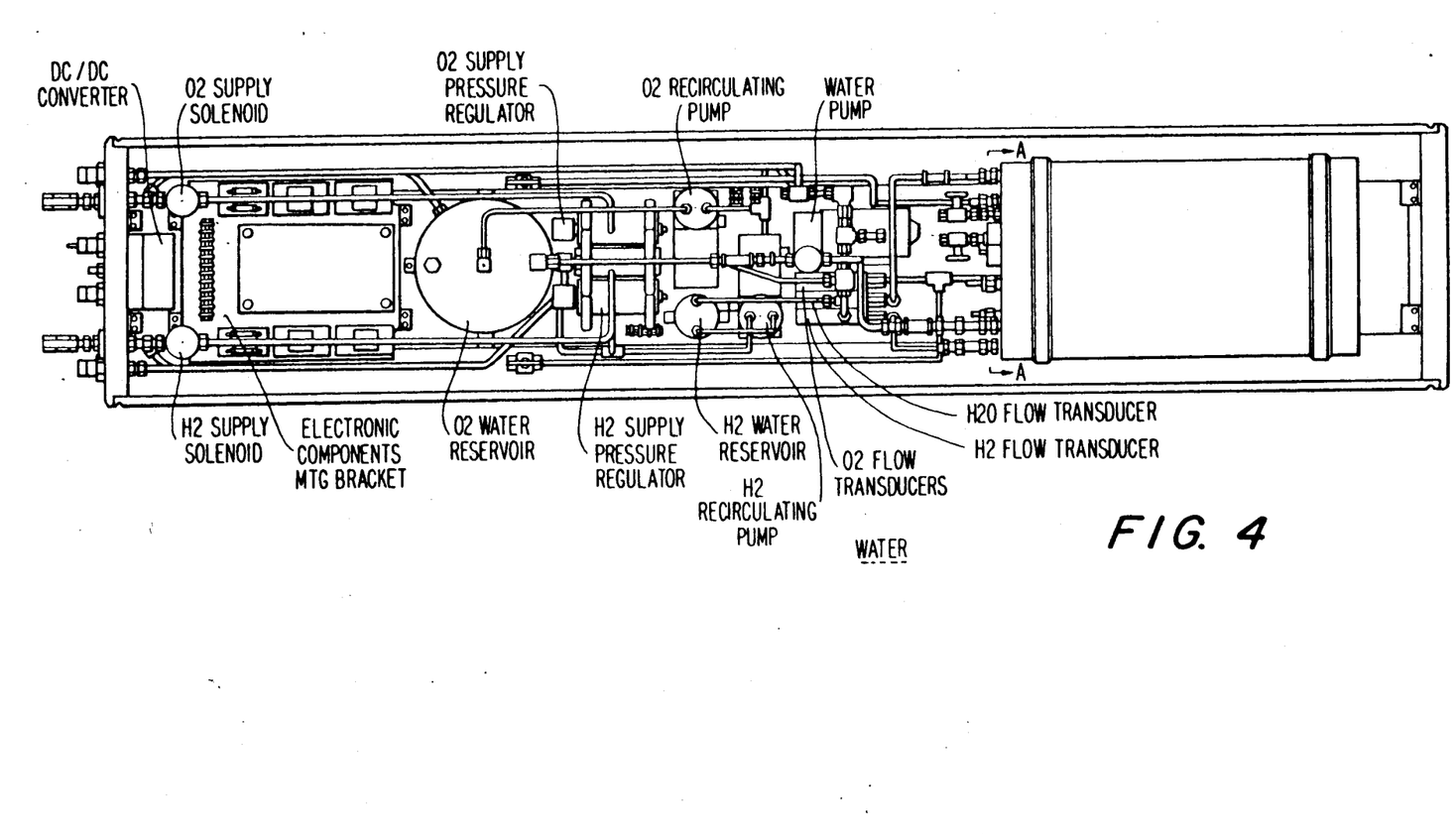
FIG. 4 is a top plan view of a fuel cell stack power module in accordance with the present invention.

The fuel cell stack power output is tapped off through the power connector 130, passing through the container end plate 86.

EXAMPLE

The enclosed modular container system depicted in FIG. 4 was utilized as the auxiliary power system for a research submersible. The outer container 10 had a internal diameter of 15 inches and a total internal length of 72 inches. The outer shell was capable of withstanding a pressure differential of 450 PSI across its walls.

Hydrogen and oxygen gas bottles at a pressure of 2250 PSIG were attached to the gas supply valves 4,5. The fuel cell stack is an available Ballard Mark V, 5 kilowatt hydrogen/oxygen fuel cell stack with a solid polymer electrolyte. At steady state operation, the recycle hydrogen flow through line 51 is 9 liters per minute STP and the recycle flow of oxygen through line 50 is 9 liters per minute STP. The repressurization pumps 54, 55 are rated to increase the pressure from 28 psig to 30 psig and the water reservoirs have a total internal capacity of 10 liters for the oxygen reservoir 30 and 1 liter for the hydrogen reservoir 31. The amount of water should not be greater than 8 liters for the oxygen reservoir 30 0.75 liters for the hydrogen reservoir 31. The cooling water flow at steady state operation as measured by the liquid flow meter 68 is 6.5 liters per minute. When operating in sea water having a temperature of 80° F. The heat exchanger has a heat exchange surface area of 57 sq. in.

The pressure of the reactant gases at the pressure sensors 20, 21 is adjusted to be 30 psig.

This fuel cell system can operate continuously for at least 3 hours depending upon the amount of hydrogen an oxygen reactants provided. The total volume within the close loop system is sufficiently great that any accumulation of inerts which may be present in the reactant gas supply or which may result from operation of the system do not accumulate in sufficient concentration to interfere with the fuel cells operation. This fully enclosed and compact system is thus especially valuable for those situations where these attributes are valuable, such as for submersibles or spacecraft.

The patentable embodiments of this invention which are claimed are as follows:

1. A closed loop reactant/product management system for electrochemical galvanic energy devices, the system comprising:
   (a) a modular package comprising a plurality of galvanic cells, two internal gas flow conduit means for independently carrying each of two gaseous reactants, which form a liquid product within the galvanic cells, and an internal liquid flow conduit means for independently carrying a cooling liquid to the galvanic cells, the cooling liquid being derived from the liquid product;
   (b) first and second gas supply connecting means each designed to provide make-up gaseous reactants, respectively, to the system;
   (c) indirect heat exchanger means in fluid flow connection with the internal liquid flow conduit means;
   (d) first and second liquid-gas separator means and first and second liquid reservoir means, the respective separator means and reservoir means being in open fluid flow connection, each of the reservoir means being designed to provide a liquid-free, gas-filled space in an upper portion thereof and to maintain liquid in the lower portion, the first reservoir means being in pressure-tight fluid flow connection with the heat exchanger means and with the respective internal liquid flow passage, each of the first and second reservoir means being in pressure-tight fluid flow connection with the respective first and second gas supply connecting means, and the first and second liquid-gas separator means being in pressure tight fluid flow connection with the respective gas flow conduit means; and (f) gas repressurization means between each of the gas flow conduit means and the respective liquid-gas separator means, designed to increase the pressure of gas from the internal gas flow conduit means.

2. The closed loop reactant/product management system of claim 1, wherein each of the internal gas and liquid flow passages has an inlet and an outlet with respect to the modular package;

the first liquid-gas separator means and the first liquid reservoir means have a make-up gas inlet, a liquid inlet and a liquid outlet located at a lower portion of the reservoir means (the liquid outlet being in pressure-tight fluid flow connection with the inlet to the internal liquid flow passage), a repressurized gas inlet to the liquid-gas separator means and a gas outlet located at an uppe portion of the reservoir means;

the second liquid-gas separator and liquid reservoir means have a make-up gas inlet located at a lower portion of the reservoir means, an exhaust gas inlet to the liquid-gas separator means and a gas outlet located at an upper portion of the reservoir means;

the indirect heat exchanger means being in fluid flow connection intermediate the upper liquid inlet to the first reservoir means and the liquid outlet from the internal liquid flow passages; and first and second gas inlet fluid connecting means between the upper gas outlet in each reservoir means and the gas inlets to the modular package.

3. The closed loop reactant/product management system of claim 2 further comprising a central microprocessor linked monitor and control system, the monitor and control system comprising:

first and second gas pressure sensors located adjacent to, and operably connected to, the inlet to the first and second internal gas flow passages, respectively;

first and second gas flow sensors located in fluid flow connection intermediate the first and second gas repressurization means and the first and second reservoir means, respectively;

and liquid flow sensor means located in fluid flow connection intermediate the inlet to the liquid flow passage and the first reservoir;

a central microprocessor linking the sensors and designed to receive data from the sensors and to compare such date with pre-programmed values, and to transmit signals in response to such comparisons; and (e) fail/safe valves operably connected to the central microprocessor and designed to respond to the signals transmitted by the microprocessor.

4. A closed loop reactant/product management system for electrochemical galvanic energy devices, the system comprising: fuel cell means comprising first and second internal reactant gas conduit means, and internal coolant liquid conduit means; first and second reactant gas supply connecting means; indirect heat exchanger means in fluid flow connection with the internal liquid flow conduit means; first liquid-gas separator and liquid reservoir means in pressure-tight fluid flow connection with the heat exchanger means and with the internal liquid flow conduit means and with the first internal gas flow conduit means; second liquid-gas separator and liquid reservoir means in pressure-tight fluid flow connection with the second internal gas flow conduit means and second gas supply connecting means; and gas repressurization means between each of the internal gas flow conduit means and the liquid-gas separator means, respectively, designed to increase the pressure of gas from the internal gas flow conduit means.

5. The closed loop reactant/product management system according to claim 4, comprising liquid pumping means in fluid flow connection intermediate the first liquid reservoir means and the internal liquid flow conduit means for pumping a liquid product formed within the fuel cell means, by the two reactants, from the first reservoir means to the internal liquid conduit means, and further comprising means to humidify the first reactant gas utilizing the liquid product.

6. The closed loop reactant/product management system according to claim 5, comprising means to humidify the first reactant gas outside of the fuel cell means.

7. The closed loop reactant/product management system according to claim 4, wherein the gas supply connecting means comprises first and second pressure regulating means designed to reduce gas pressure from a high storage pressure to the pressure within the first and second internal gas conduit means.

8. The closed loop reactant/product management system according to claim 4, comprising a liquid diverter valve means, in fluid flow connection between the internal liquid conduit means, the heat exchanger means and the first reservoir means.

9. In a process for galvanically generating electricity comprising: (a) separately passing an excess of a fuel and an oxidant gas through a stack of fuel cells; separately withdrawing the excess fuel and the excess oxidant gas from the fuel cell stack, the oxidant gas being removed together with a product liquid; and passing a coolant liquid past the fuel cells to remove excess heat therefrom; the improvement comprising: repressurizing each of the excess fuel and oxidant gases; admixing the excess fuel and oxidant gases with additional fuel and oxidant gases, respectively; separating out product liquid from the excess oxygen and admixing the separated product liquid with cooling liquid; separating out and storing product liquid from the excess hydrogen; and humidifying the fuel and oxidant gases with the separated product liquid before the gases are passed to the stack of fuel cells.

* * * * *